INVENTOR
CHARLES TOTH

# United States Patent Office 3,677,742
Patented July 18, 1972

3,677,742
PROCESS FOR INCREASING THE PERCENTAGE OF ALUMINUM IN ALUMINUM-MANGANESE ALLOYS
Charles Toth, Westwego, La., assignor to Applied Aluminum Research Corporation, Westwego, La.
Filed Dec. 31, 1969, Ser. No. 889,402
Int. Cl. C22b 21/02, 21/06
U.S. Cl. 75—68 B                12 Claims

ABSTRACT OF THE DISCLOSURE

Process for increasing the percentage of aluminum in an aluminum-manganese alloy comprising bringing a liquid solution of said alloy to a temperature sufficient to effect phase separation into a solid phase rich in manganese and a liquid phase rich in aluminum and isolating these phases from each other.

BACKGROUND OF THE INVENTION

The production of aluminum by the reaction of manganese with aluminum trichloride is set forth in applicant's copending and commonly assigned U.S. patent application Ser. No. 692,036, now U.S. Pat. 3,615,359, the teachings of which are herein incorporated by reference. The principal reaction occurring is illustrated by the following reaction equation:

$$2AlCl_3 + 3Mn \rightarrow 3MnCl_2 + 2Al$$

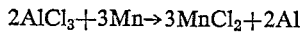

In this reaction, elemental liquid aluminum is produced while manganese is converted into manganese chloride. The aluminum reaction product is easily separated from unreacted aluminum trichloride which is a gas and from the formed manganese chloride which is either a gas or else a liquid immiscible with the formed aluminum. The aluminum is, however, ordinarily contaminated with unconverted manganese reactant.

In many applications the final product resulting from the method of application Ser. No. 692,036 is satisfactory since it is well known in the art that manganese imparts desirable properties to aluminum. Thus, approximately 75% of all the aluminum sold contains 0.1 to 2% manganese. In fact, it is common practice in the aluminum art to add managanese to otherwise manganese-free aluminum to produce a "master alloy." Manganese is especially desirable in an aluminum alloy to be used in extrusion products which is only one of many uses for "master alloys." However, the manganese component has the disadvantage of increasing the density of the alloy. Thus, where a light weight alloy is needed, it is desirable to increase the percentage of aluminum in the alloy. Also, increasing the percentage of aluminum lowers the melting point which may be desired.

SUMMARY OF THE INVENTION

In accordance with the present invention the reaction product of application Ser. No. 692,036, or indeed any aluminum-manganese alloy containing up to 90% by weight manganese, is treated to increase its aluminum percentage. The treatment comprises cooling a liquid solution of the aluminum-manganese alloy to a temperature sufficient to effect phase separation into two phases, a liquid phase richer in aluminum than the starting material alloy and solid phase richer in manganese than the starting material alloy. The phases are easily isolated from each other.

It is accordingly a principal object of the present invention to provide a method for increasing the percentage of aluminum in an aluminum-manganese alloy.

DESCRIPTION OF THE PREFERRED EMBODIMENTS

The invention advantageously utilizes the fact that a molten solution of aluminum and manganese, when cooled to a proper temperature, separates into two portions by partially solidifying as an alloy richer in manganese than the starting solution, leaving as a liquid phase a fraction richer in aluminum than the starting solution. Once separated into such portions, the aluminum-rich liquid portion may be isolated from the manganese-rich solid portion. Isolation of the above phases may be accomplished by any convenient liquid-solid separation method, for example by filtering, decanting, floating or centrifuging.

In particular, the method of the present invention comprises (1) melting the aluminum-manganese alloy reaction product of the method of application Ser. No. 692,036 if it is not already in melted condition, (2) bringing the temperature of the melted composition to be within the shaded area of FIG. 1 to produce a manganese-rich solid phase and an aluminum-rich liquid phase, and (3) isolating the phases from each other.

Figure 1:
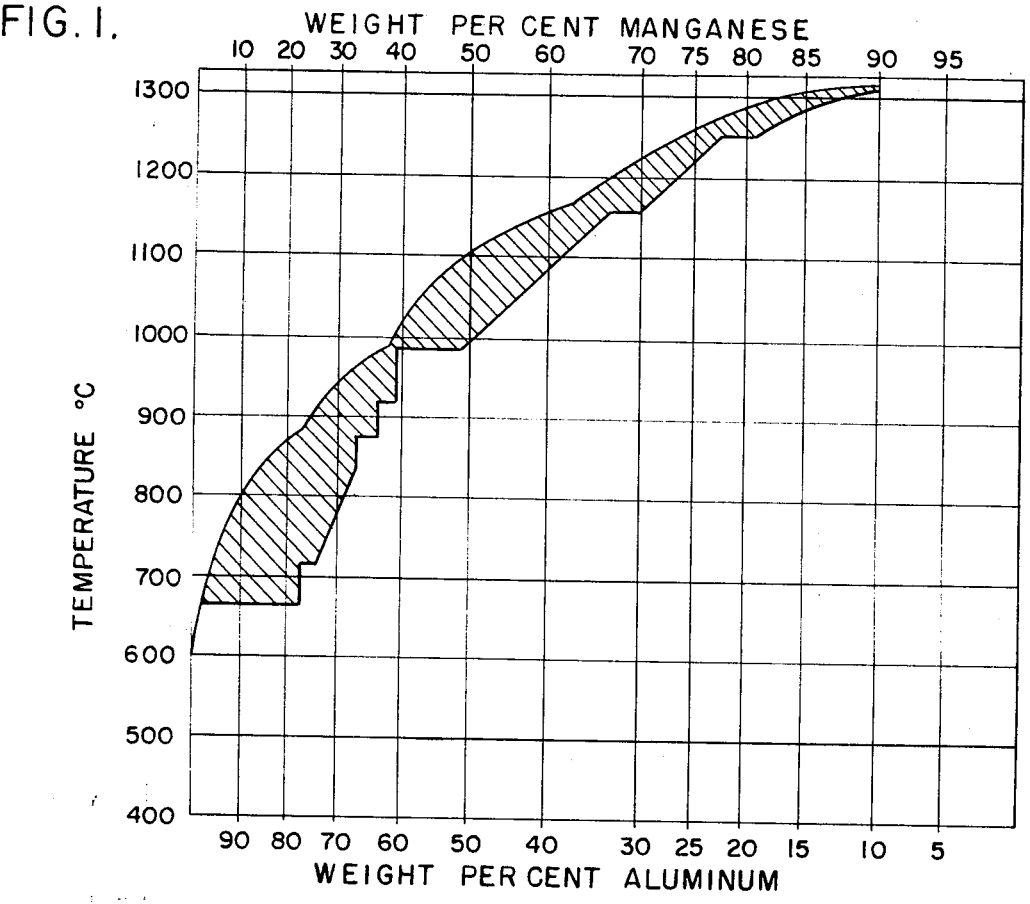
FIG. 1 is a graph depicting the critical temperature-alloy composition relationship which is essential to the present invention.

As can be seen from FIG. 1, the invention is operable on alloy starting materials containing less than 90 weight percent manganese and more than about 5 weight percent manganese, the remainder being aluminum. Preferably, the starting material contains by weight from 15% to 30% manganese, the remainder being aluminum.

If the starting material is utilized directly after its preparation, it is already in molten condition and is ready to have its temperature adjusted within the scope of the present invention to form two phases as described above. If, on the other hand, the starting material has been allowed to solidify, for example by being poured into ingots, it must be melted previous to having its temperature adjusted to produce phase separation. This melting can be carried out by simply raising the temperature of the alloy above the temperature defined by the top boundary of the shaded area of FIG. 1. As can be seen from FIG. 1, the particular melting temperature depends on the alloy composition. In general, the greater the weight percentage of manganese in the composition is, the higher the composition's melting point is. Thus, a composition containing 20% by weight manganese has a melting point of approximately 875° C.; a composition containing 70% by weight manganese has a melting point of approximately 1225° C. In general, melting points of various compositions range from about 700° C. to about 1300° C. Higher temperatures than the melting points can also be used; for example, temperatures as high as 1600° C. can be used. Temperatures above 1600° C. are ordinarily not used for reasons of economy. The melting can be carried out by any convenient method, for example, in a furnace.

The melted, that is, liquid, composition is then brought to a temperature within the shaded area of FIG. 1 whereby the liquid phase has its aluminum percentage increased. This temperature is denoted a separation temperature. As can be seen from FIG. 1, the higher the percentage of manganese in the melted alloy starting material, the higher is the separation temperature required to be utilized. Temperatures above the upper boundary of the shaded area of FIG. 1 will not cause separation since only a single liquid phase will be present. Temperatures below the lower boundary of the shaded area are not useful because only solid will be present. The composition of the liquid and solid phases resulting from the temperature adjustment can be determined from FIG. 1 by drawing a horizontal line through the final, that is the separation, temperature; the liquid portion or phase resulting has the composition defined by the point where the horizontal line followed toward the left intersects the boundary of the shaded area while the solid portion or phase resulting has the composition defined by the point where the horizontal line followed toward the right intersects the boundary of the shaded area. In illustration of FIG. 1, an alloy containing 20% manganese and 80% aluminum if melted and then temperature-adjusted to 710° C. results in a liquid phase containing 96% aluminum and 4% manganese and solid phase containing about 68% aluminum and about 32% manganese. The temperature reduction, i.e. the cooling, essential to separation can be carried out by any convenient method, for example by cooling coils or by simply allowing the temperature to be reduced by heat transfer due to ambient conditions or by the application of cooler inert gas.

In one important embodiment of the invention the aluminum-manganese alloy starting material is placed in a filter medium, generally resembling a Gooch crucible, brought to the proper temperature to effect phase separation and filtered to isolate as a filtrate a liquid phase rich in aluminum leaving a manganese rich aluminum alloy as a residue. The residue may then be treated with aluminum trichloride to increase the aluminum concentration in accordance with the invention of application Ser. No. 692,036. The foregoing procedure may be repeated after the aluminum concentration is increased to isolate additional aluminum-rich alloys.

In another important embodiment of the invention the alloy is placed in a vessel such as a ceramic crucible and brought to the required temperature to effect phase separation. The liquid phase may then be removed from the solid phase by decanting or decantation following centrifuging of the crucible.

Figure 2:
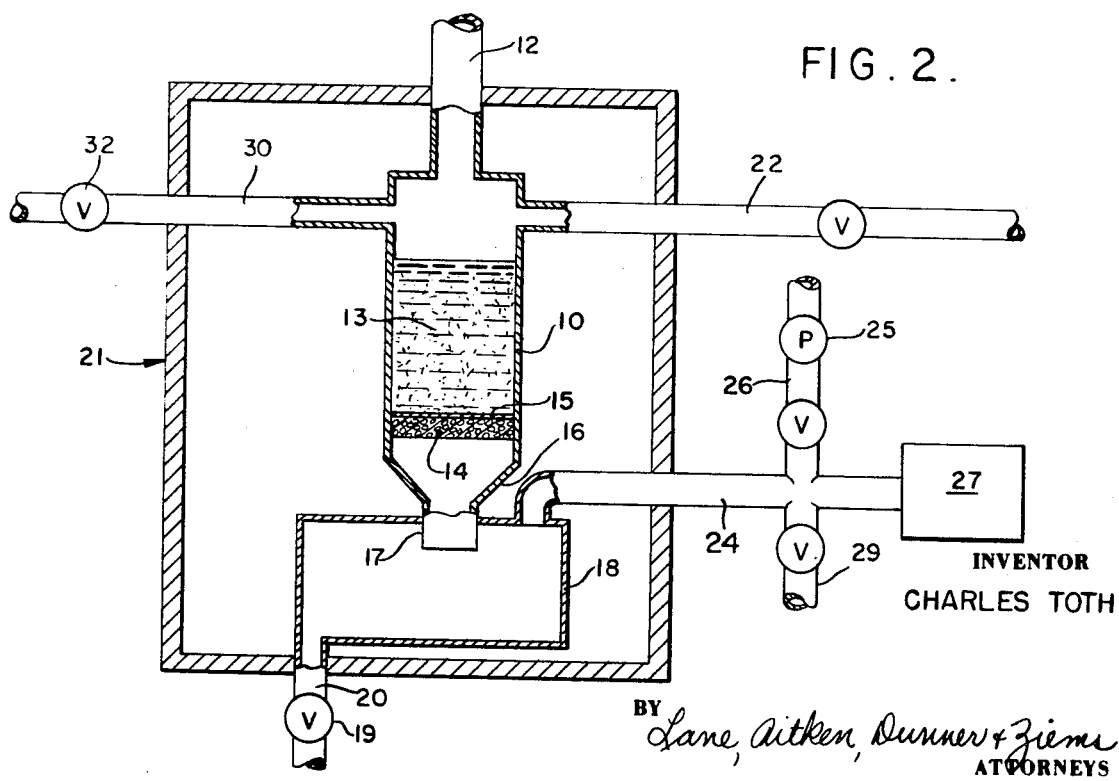
FIG. 2 is a schematic diagram in elevational cross-section illustrating a process within the scope of the present invention.

An embodiment of the process of the present invention utilizing filtering as an isolation method is shown schematically in FIG. 2. In general, this embodiment utilizes a filter vessel 10 of conventional ceramic material somewhat resembling a Gooch crucible which is loaded with an aluminum-manganese alloy starting material 13 in melted or solid form through an inlet 12. Positioned in a lower section of vessel 10 is a filter medium 14. Filter medium 14 is formed of porous material which is solid and inert at operating temperatures, for example, aluminum oxide (alumina). The filter medium may be utilized as either a porous disc or as an unconsolidated loose bed held together by suitable grids. In general particulate filter media has a particle size ranging from 50 microns or less to 1 centimeter. A shutter member 15 is positioned directly above filter medium 14. It is circular and flat and is coextensive with the top surface of filter medium 14. It is retractable so as to expose filter medium 14. It can be constructed of any high temperature inert material.

A funnel 16 formed in vessel 10 beneath the filter medium 14 delivers the filtrate into a receiver 18 via filter vessel exit 17. Receiver 18 is provided with a conduit 20 which provides the means for removing the filtrate from within the receiver 18. Conduit 20 is equipped with valve 19.

Once melted, if melting is necessary, and then brought to the proper temperature, the aluminum-manganese alloy separates into two phases as pointed out above. The melting and following temperature reduction can be carried out by furnace and cooling device 21. The melted alloy is retained above filter medium 14 by shutter member 15 until proper separation has occurred. When proper separation has occurred, shutter member 15 is retracted. The separated liquid phase which is rich in aluminum passes through the filter medium where it is collected and removed from the system.

Although acceptable results are obtainable by performing the process with equipment as generally described above, optimum operation is made possible by including various plumbing for introducing an inert gas purge, for heating the residue to return it to the liquid phase and for introducing aluminum trichloride gas into the vessel 10 so as to contact the residue.

To accomplish these objectives, filter vessel 10 is provided with valved inlet 22 located in an upper section of vessel 10 above the level of the aluminum-manganese alloy starting material. Through inlet 22 an inert gas or inert gas mixtures, for example, nitrogen, helium, argon or mixtures thereof, can be fed into the vessel 10. The presence of an inert gas prevents oxidation of the alloy within vessel 10. The inert gas purge also assists the filtering process by establishing hydraulic pressure above the alloy which forces the filtrate through the filter medium.

To further facilitate the filtering process, a conduit 24 is provided. Conduit 24 is connected to receiver 18 and enables gas flow from conduit 24 through receiver 18 into vessel 10 and vice versa. Conduit 24 serves a dual purpose. A valved side duct 26 connects conduit 24 to a vacuum pump 25 which permits reduction of the pressure within receiver 18 thereby further assisting the filtration process. Thus, in accordance with this embodiment of the invention filtration is greatly facilitated by a pressure differential resulting from a positive pressure above the solution between about 1 p.s.i.g. to 250 p.s.i.g. which is maintained by an inert gas purge from conduit 22 fed at the rate of between about 1 to 1000 cubic feet per minute and a reduced pressure beneath the filter medium 14 which is maintained between the range of approximately 1 p.s.i.a. to 7 p.s.i.a. by vacuum pump 25.

After a batch of an aluminum-manganese alloy has been processed and the liquid phase, i.e., the filtrate has passed through filter 14 and has been recovered in receiver 18, the filtrate is withdrawn from receiver 18 through conduit 20. At this point in time, the filter medium 14 contains solid aluminum-manganese alloy rich in manganese which may be removed by utilizing blower 27 at the upstream end of conduit 24 to pass a stream of air through conduit 24 with the valve in conduit 20 closed to exert a pressure beneath the metal filter cake within the filter medium 14 to remove the filter cake from medium 14.

After the filter cake is removed from the filter medium 14, it can be heated to a temperature sufficient to change the solid phase to liquid phase, i.e. to a temperature exceeding that defined by the upper boundary of the shaded area in FIG. 1. This may be accomplished in several ways, For example, furnace 21 can be utilized. Although a furnace is shown it is to be understood that melting may be accomplished by other means. For example, the filter vessel 10 can be appropriately surrounded by a helical induction coil which is capable of bringing the contents of this vessel to the desired temperature. Also, it is possible to remelt the filter cake which has been blown back into the vessel by pouring a molten aluminum-manganese alloy through inlet 12.

To increase the aluminum concentration within the resulting manganese-rich alloy present in filter vessel 10 after a filtration cycle, aluminum trichloride gas can be introduced along conduit 24 from valved conduit 29 into contact with the alloy in melted form in vessel 10. The flow rates, temperatures and pressures of the aluminum trichloride gas employed in this step are identical to those disclosed in application Ser. No. 692,036.

In order to facilitate aluminum trichloride treatment of the filtration process manganese-rich residue, a conduit 30 for removing overhead gases formed during such treatment is provided. Conduit 30 is provided with a valve 32 which is closed during the filtration treatment. Once the filtration step is completed, the residue is forced out of the filter medium and remelted, valve 32 is opened and aluminum trichloride gas is introduced into the vessel from conduit 29. During aluminum trichloride treatment, the flow of inert gas along conduit 22 is terminated. Through conduit 30 overhead gases, notably manganese chloride, are delivered out of the system for further treatment.

Once the aluminum concentration within the alloy in vessel 10 has been increased, the entire isolation process described above can be repeated, resulting in production of additional alloy with increased aluminum percentage.

Above, the solid residue is blown from the filter medium, reheated and treated to increase the aluminum concentration. It is to be understood, however, that the process is not limited to this specific sequence. For example the solid residue within the filter medium may be heated sufficiently to effect a change of phase from a solid to a liquid and allowed to flow into receiver 18. When this approach is used the aluminum-rich filtrate should be removed from receiver 18 by draining prior to introduction of the melted manganese-rich residue. The residue can then be removed as a liquid through conduit 20, treated in a separate system to increase the aluminum concentration whereupon the treated residue can be introduced back into the vessel 10 through inlet 12 for further treatment to increase its aluminum percentage.

The present invention is further illustrated in the following example wherein aluminum-manganese alloy starting material has its aluminum percentage increased.

Example 100 lbs. of an aluminum-manganese alloy having a composition by weight of 80% aluminum to 20% manganese and produced in accordance with the process of application Ser. No. 692,036 is introduced into a reaction chamber containing a conventional liquids-solids alumina filter. The alloy is introduced as a molten liquid at a temperature of about 1300° C. and is allowed to cool to a temperature of approximately 710° C. by normal heat loss due to ambient conditions. When the alloy has reached a temperature of 710° C., it is in two phases, a liquid phase and a solid phase. This combination is filtered utilizing the filter medium. To facilitate filtering, argon gas at a pressure of 50 p.s.i.g. is maintained above the surface of the alloy while a pressure of 5 p.s.i.a. is maintained beneath the filter medium. From the 100 lbs. of alloy introduced, 43 lbs. of liquid filtrate passes through the filter into a receiver. The composition of the filtrate is 96% by weight aluminum and 4% by weight manganese. 57 pounds of solid residue remain in the filter. The composition of the residue is 68% by weight of aluminum and 32% by weight of manganese. Solid residue is removed from the filter medium by applying forced nitrogen at a pressure of 50 p.s.i.g. toward the bottom of the filter medium. Once removed from the filter medium, the residue in combination with 36 lbs. of added manganese is heated to a temperature of 1350° C. and contacted for 2 hours with aluminum trichloride gas at a temperature of 1300° C., pressure of 150 p.s.i.g. and flow rate of 4 lbs. per minute, thereby increasing the aluminum concentration in the residue to 80%. The isolation process described is then repeated by bringing the alloy to a temperature of approximately 710° C.

The foregoing process provides a method for increasing the percentage of aluminum in an aluminum-manganese alloy; it presents an economically feasible approach for treating the reaction product of application Ser. No. 692,036 so as to increase the weight percent of aluminum in the resulting alloy.

The invention may be embodied in other specific forms without departing from the spirit or essential characteristics thereof. For example, the starting material can be added to the reaction chamber as a solid and melted therein and isolating methods such as decanting, floating, or centrifuging can be utilized instead of filtering. The present embodiments are therefore to be considered in all respects as illustrative and not restrictive, the scope of the invention being indicated by the appended claims rather than by the foregoing description, and all changes that come within the meaning and range of equivalency of the claims are therefore intended to be embraced therein.

I claim:

1. A process for producing aluminum, comprising the steps of: (a) reacting gaseous aluminum trichloride with manganese in a reaction zone at a temperature sufficient to reduce the aluminum trichloride to produce a liquid aluminum alloy, said manganese being contained in a mass at least about 5% by weight of which is manganese at least at the time the aluminum trichloride first contacts said manganese at the beginning of said reaction, said reaction being carried out to provide a net increase in the quantity of said liquid aluminum alloy produced from said reaction zone; (b) cooling said melted aluminum alloy to a temperature sufficient to effect phase separation into two phases, a liquid phase richer in aluminum than said aluminum alloy and a solid phase richer in manganese than said aluminum alloy; and (c) isolating said phases from each other.

2. The process set forth in claim 1, wherein said melted aluminum alloy is cooled to a temperature defined by the shaded area in FIG. 1.

3. The process set forth in claim 1, wherein said aluminum alloy contains by weight from about 15% to about 30% manganese.

4. The process set forth in claim 3, wherein said aluminum alloy contains about 20% by weight manganese and about 80% by weight aluminum and the temperature at which said melted aluminum alloy is cooled is about 710° C.

5. The process set forth in claim 1, wherein said isolating step is carried out by passing said liquid phase aluminum through a filter medium and preventing said liquid phase aluminum from passing through said filter medium until the proper temperature is reached and the proper phase separation has taken place.

6. The process set forth in claim 1, and further including the steps of: (a) melting the solid phase isolated from the liquid phase; (b) reacting aluminum trichloride with said melted solid phase in a reaction zone at a temperature sufficient to reduce the aluminum trichloride to a liquid aluminum, said melted solid phase including at least about 5% by weight of manganese at least at the time the aluminum trichloride first contacts said melted solid phase at the beginning of said reaction, said reaction being carried out to provide a net increase in the quantity of liquid aluminum produced from said reaction zone.

7. A process for producing aluminum, comprising the steps of: (a) reacting alumina with manganese chloride under reducing conditions and in the presence of oxygen and a substantially hydrogen-free carbon-containing material so as to form aluminum trichloride and manganese; (b) reacting said aluminum trichloride with said manganese at a temperature sufficient to reduce said aluminum trichloride to an aluminum alloy; (c) said reactions in steps (a) and (b) taking place in separate zones; (d) melting said aluminum alloy if it is not already in melted condition; (e) cooling said melted aluminum alloy to a temperature sufficient to effect phase separation into two phases, a liquid phase richer in aluminum than said aluminum alloy and a solid phase richer in manganese than said aluminum alloy; and (f) isolating said phases from each other.

8. The process set forth in claim 7, wherein said melted aluminum alloy is cooled to a temperature defined by the shaded area in FIG. 1.

9. The process set forth in claim 7, wherein said aluminum alloy contains by weight from about 15% to about 30% manganese.

10. The process set forth in claim 9, wherein said aluminum alloy contains about 20% by weight manganese and about 80% by weight aluminum and the temperature at which said melted aluminum alloy is cooled is about 710° C.

11. The process set forth in claim 7, wherein said isolating step is carried out by passing said liquid phase aluminum through a filter medium and preventing said liquid phase aluminum from passing through said filter medium until the proper temperature is reached and the proper phase separation has taken place.

12. The process set forth in claim 7, and further including the steps of: (a) melting the solid phase isolated from the liquid phase; (b) reacting aluminum trichloride with said melted solid phase in a reaction zone at a temperature sufficient to reduce the aluminum trichloride to a liquid aluminum, said melted solid phase including at least about 5% by weight of manganese at least at the time the aluminum trichloride first contacts said melted solid phase at the beginning of said reaction, said reaction being carried out to provide a net increase in the quantity of liquid aluminum produced from said reaction zone.

References Cited

UNITED STATES PATENTS

| | | | |
|---|---|---|---|
| 2,452,665 | 11/1948 | Kroll et al. | 75—63 |
| 2,471,899 | 5/1949 | Regner | 75—63 |
| 2,750,262 | 6/1956 | Pfann | 75—63 X |
| 3,168,394 | 2/1965 | Johnson | 75—68 A |
| 3,211,547 | 10/1965 | Jarrett et al. | 75—68 R |
| 3,239,899 | 3/1966 | Johnson | 75—68 R |
| 3,249,425 | 5/1966 | Aamot | 75—68 R |
| 3,254,989 | 6/1966 | Olds | 75—68 R |
| 3,303,019 | 2/1967 | Jacobs | 75—68 R |

FOREIGN PATENTS

| | | | |
|---|---|---|---|
| 553,809 | 6/1943 | Great Britain | 75—68 |
| 557,553 | 11/1943 | Great Britain | 75—68 |

HENRY W. TARRING II, Primary Examiner

U.S. Cl. X.R.

75—68 R, 63